United States Patent
Nakade et al.

(10) Patent No.: US 12,513,277 B2
(45) Date of Patent: Dec. 30, 2025

(54) HEAD MOUNTED DISPLAY

(71) Applicant: Maxell, Ltd., Kyoto (JP)

(72) Inventors: Mayumi Nakade, Kyoto (JP); Masuo Oku, Kyoto (JP); Yasunobu Hashimoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 50 days.

(21) Appl. No.: 18/561,332

(22) PCT Filed: May 17, 2021

(86) PCT No.: PCT/JP2021/018597
§ 371 (c)(1),
(2) Date: Nov. 16, 2023

(87) PCT Pub. No.: WO2022/244052
PCT Pub. Date: Nov. 24, 2022

(65) Prior Publication Data
US 2024/0244173 A1    Jul. 18, 2024

(51) Int. Cl.
| H04N 13/156 | (2018.01) |
| G06F 3/01 | (2006.01) |
| G06F 3/16 | (2006.01) |
| G09G 5/377 | (2006.01) |
| H04N 13/183 | (2018.01) |
| H04N 13/296 | (2018.01) |

(52) U.S. Cl.
CPC ........... *H04N 13/156* (2018.05); *G06F 3/017* (2013.01); *G06F 3/167* (2013.01); *G09G 5/377* (2013.01); *H04N 13/183* (2018.05); *H04N 13/296* (2018.05)

(58) Field of Classification Search
CPC .. H04N 13/156; H04N 13/183; H04N 13/296; G06F 3/017; G06F 3/167; G06F 3/01; G09G 5/377; G09G 5/00
USPC ............................................ 348/43
See application file for complete search history.

(56) References Cited

U.S. PATENT DOCUMENTS

| 10,416,760 | B2 * | 9/2019 | Burns ................. G06F 3/011 |
| 10,425,813 | B2 | 9/2019 | Nakagawa |
| 2014/0364197 | A1 | 12/2014 | Osman et al. |
| 2016/0292922 | A1 * | 10/2016 | Kasahara ............... G06F 3/017 |
| 2016/0335801 | A1 * | 11/2016 | Yoon .................. G06F 3/04842 |

(Continued)

FOREIGN PATENT DOCUMENTS

| JP | 2005-086328 A | 3/2005 |
| JP | 2016-525917 A | 9/2016 |

(Continued)

OTHER PUBLICATIONS

International Search Report and Written Opinion mailed on Jul. 20, 2021, received for PCT Application PCT/JP2021/018597, filed on May 17, 2021, 10 pages including English Translation.

*Primary Examiner* — Susan E. Hodges
(74) *Attorney, Agent, or Firm* — XSENSUS LLP

(57) ABSTRACT

A head mounted display includes a non-transmissive display for displaying a VR image, a camera, and a controller, the controller analyzing a captured image generated by the camera while a user is experiencing VR contents, and when it is determined from the captured image that the user is holding an information processor, causing a non-transmissive display to superimpose the VR image and an image of the information processor and display them.

8 Claims, 16 Drawing Sheets

(56) References Cited

U.S. PATENT DOCUMENTS

| | | | |
|---|---|---|---|
| 2017/0011553 A1* | 1/2017 | Chen | G02B 27/0172 |
| 2017/0206673 A1 | 7/2017 | Kawamoto | |
| 2018/0150996 A1* | 5/2018 | Gatta | G06F 3/012 |
| 2018/0164589 A1 | 6/2018 | Watanabe et al. | |
| 2019/0096130 A1* | 3/2019 | Shim | G06F 3/011 |
| 2021/0005024 A1 | 1/2021 | Mizuno | |

FOREIGN PATENT DOCUMENTS

| | | | | |
|---|---|---|---|---|
| JP | 6300705 B2 | 3/2018 | | |
| WO | 2014/188798 A1 | 11/2014 | | |
| WO | 2016/021252 A1 | 2/2016 | | |
| WO | 2016/194844 A1 | 12/2016 | | |
| WO | WO-2018135393 A1 * | 7/2018 | | A63F 13/25 |
| WO | 2020/054760 A1 | 3/2020 | | |

* cited by examiner

HEAD MOUNTED DISPLAY

CROSS-REFERENCE TO RELATED APPLICATION

The present application is based on PCT filing PCT/JP2021/018597, filed May 17, 2021, the entire contents of which are incorporated herein by reference.

TECHNICAL FIELD

The present invention relates to a head mounted display (HMD: Head Mounted Display) for experiencing virtual reality (VR: Virtual Reality) contents and the like, the head mounted display being capable of starting using an information processor and the like while experiencing the contents.

BACKGROUND ART

A VR technique is known, the VR technique allowing an artificially created virtual reality space to be experienced as if it were a real space. The VR technique is applied to, for example, flight simulators, sightseeing information, games in which a large number of users participate via a network to build a virtual world, and the like. A user wearing an HMD experiences VR contents by viewing a VR content image (also referred to as a VR image) projected on a display of the HMD. The VR image is supplied from a server or the like to the HMD and is updated according to a user's motion. Such VR contents are known as so-called immersive contents.

For example, Patent Document 1 discloses that an HMD and an information processor such as a smartphone are linked to allow a user to recognize a front background through a semi-transmissive display included in the HMD. Specifically, Patent Document 1 discloses that when the smartphone receives an incoming call, an incoming call icon is displayed on the semi-transmissive display and the user operates the smartphone through the semi-transmissive display without attaching or detaching the HMD. At this time, device information of the smartphone is displayed as a two-dimensional code or the like on a screen of the smartphone, and the HMD photographs with a camera and reads the device information displayed on the smartphone. If the read device information matches device information registered in the HMD, a smartphone authentication procedure is reduced, which improves usability.

RELATED ART DOCUMENTS

Patent Documents

Patent Document 1: Japanese Patent No. 6300705

SUMMARY OF THE INVENTION

Problems to be Solved by the Invention

However, there is also an HMD having a non-transmissive display. When the HMD having the non-transmissive display is used to experience or view the immersive contents such as VR contents, the user cannot visually recognize the information processor such as a smartphone. For this reason, for example, when there is information that the user wants to browse on the information processor or when the user gets the incoming call, the user cannot perform necessary operations on the information processor in a timely manner.

Accordingly, an object of the present invention is an object to allow the user to use the information processor when the user wants to use it even while experiencing the contents with the HMD having the non-transmissive display.

Means for Solving the Problems

To solve the above-mentioned problems, for example, a configuration described in the scope of patent claims is adopted. The present application includes a plurality of means for solving the above-mentioned problems, but one example of them is raised as follows: a head mounted display includes a non-transmissive display that displays a VR image, a camera, and a controller, the controller analyzing a captured image generated by the camera while a user is experiencing VR contents, and when it is determined from the captured image that the user holds an information processor, causing the non-transmissive display to superimpose the VR image and an image of an information processor and display them.

Effects of the Invention

The present invention is to provide a head mounted display that allows the user to use the information processor when the user wants to use it even while experiencing the VR contents.

DETAILED DESCRIPTION OF PREFERRED EMBODIMENTS

Figure 1:
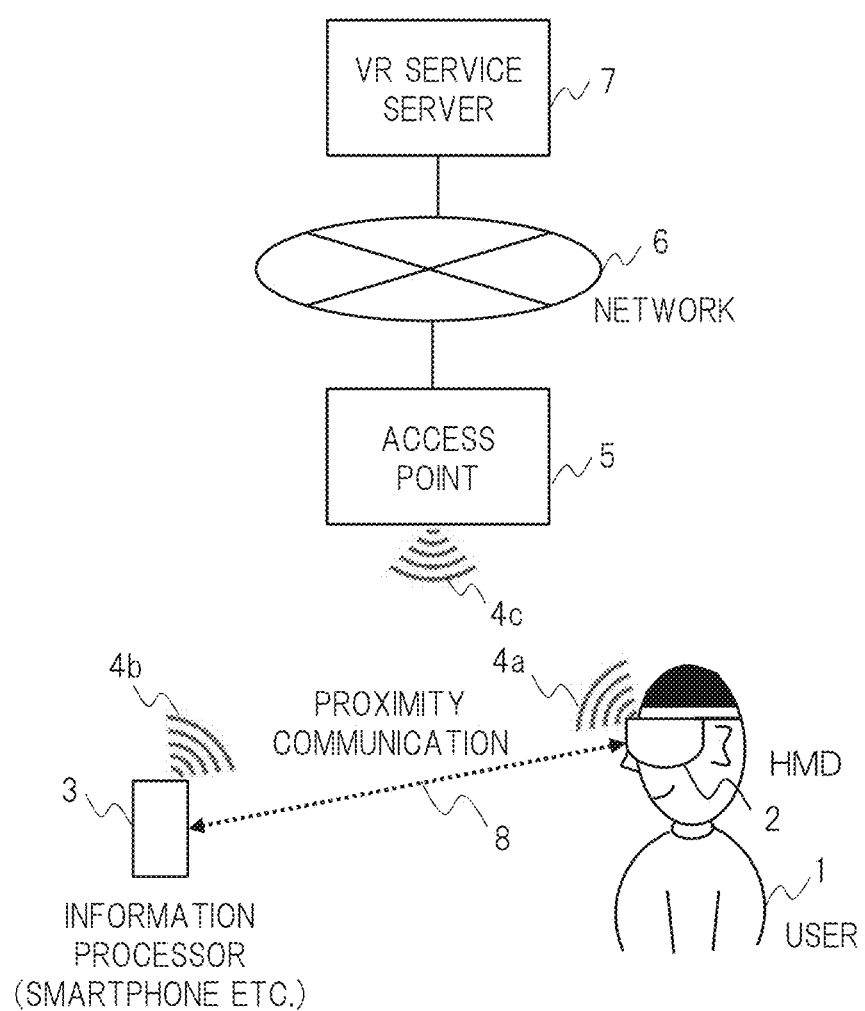
FIG. 1 is a configuration diagram showing one example of a VR sensation system including a head mounted display according to a first embodiment of the present invention.

Hereinafter, embodiments of the present invention will be described with reference to the drawings. Incidentally, the same members are denoted by the same reference numerals in all the drawings for describing the embodiments, and a repetitive description thereof will be omitted.

First Embodiment

A first embodiment will be described by using FIG. 1 to FIG. 8.
<VR Sensation System Configuration>

FIG. 1 is a configuration diagram showing one example of a VR sensation system including a head mounted display according to a first embodiment of the present invention. A VR sensation system of FIG. 1 includes a head mounted display 2 worn by a user 1, an information processor 3, a network 6, an access point 5 to the network 6, a VR service server 7, and the like.

The VR service server 7 transmits VR contents (including VR images and VR sound) to the head mounted display 2 via the network 6 and the access point 5 according to an access from the user 1 or the head mounted display 2. The user 1 wearing the head mounted display 2 experiences the VR contents that the head mounted display 2 receives from the VR service server 7 and downloads.

The VR service server 7 may be plural in number. The VR service server 7 may include a storage for storing the VR contents, a transceiver connected to the head mounted display 2, and the like. For example, a personal computer or the like can be used as the VR service server 7.

The head mounted display 2 and the information processor 3 transmit and receive various types of information to and from the VR service server 7 via the access point 5 and the network 6.

Specifically, the headed mounted display 2 transmits various pieces of information to the VR service server 7 by transmitting various pieces of information to the access point 5 with a network signal 4a. The head mounted display 2 receives various pieces of information from the VR service server 7 with a network signal 4c transmitted from the access point 5. The network signals 4a, 4b, 4c are, for example, Wi-Fi (registered trademark) signals or the like.

The information processor 3 is, for example, a smartphone, a tablet terminal, a wearable terminal, or the like, but is not limited to these. As for connection between the information processor 3 and the head mounted display 2, transmission and reception of various pieces of information may be performed by the above-mentioned network signals 4a and 4b, or the transmission and reception of the information may be performed by a proximity communication 8. The proximity communication 8 is, for example, Bluetooth (registered trademark).

Figure 2:
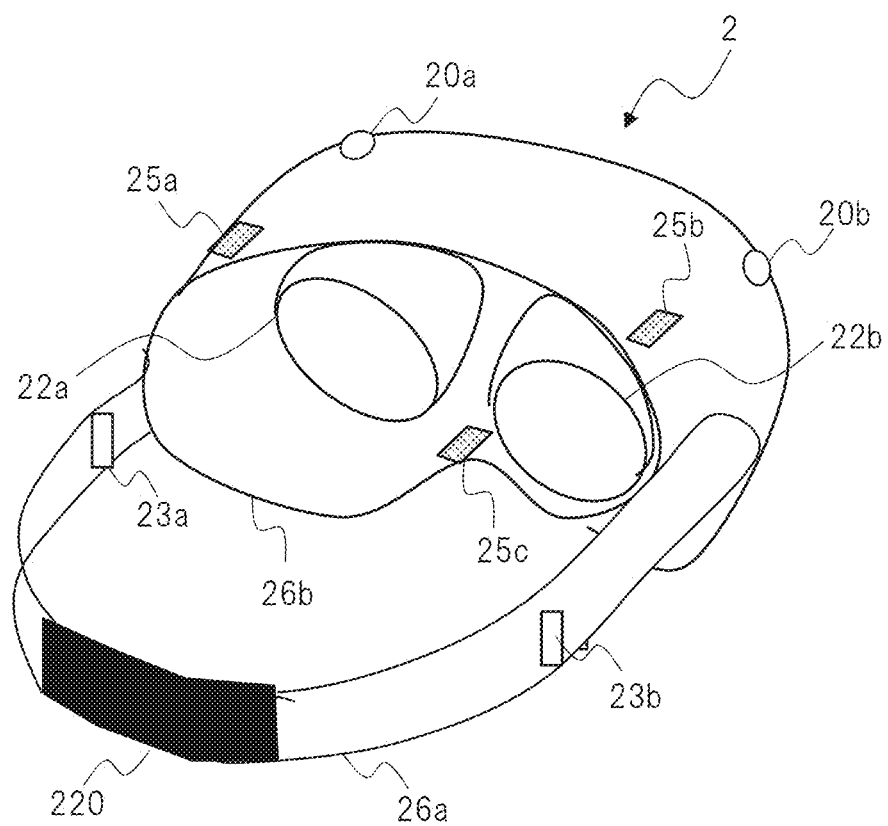
FIG. 2 is an external view showing one example of the head mounted display according to the first embodiment of the present invention.
Figure 3A:
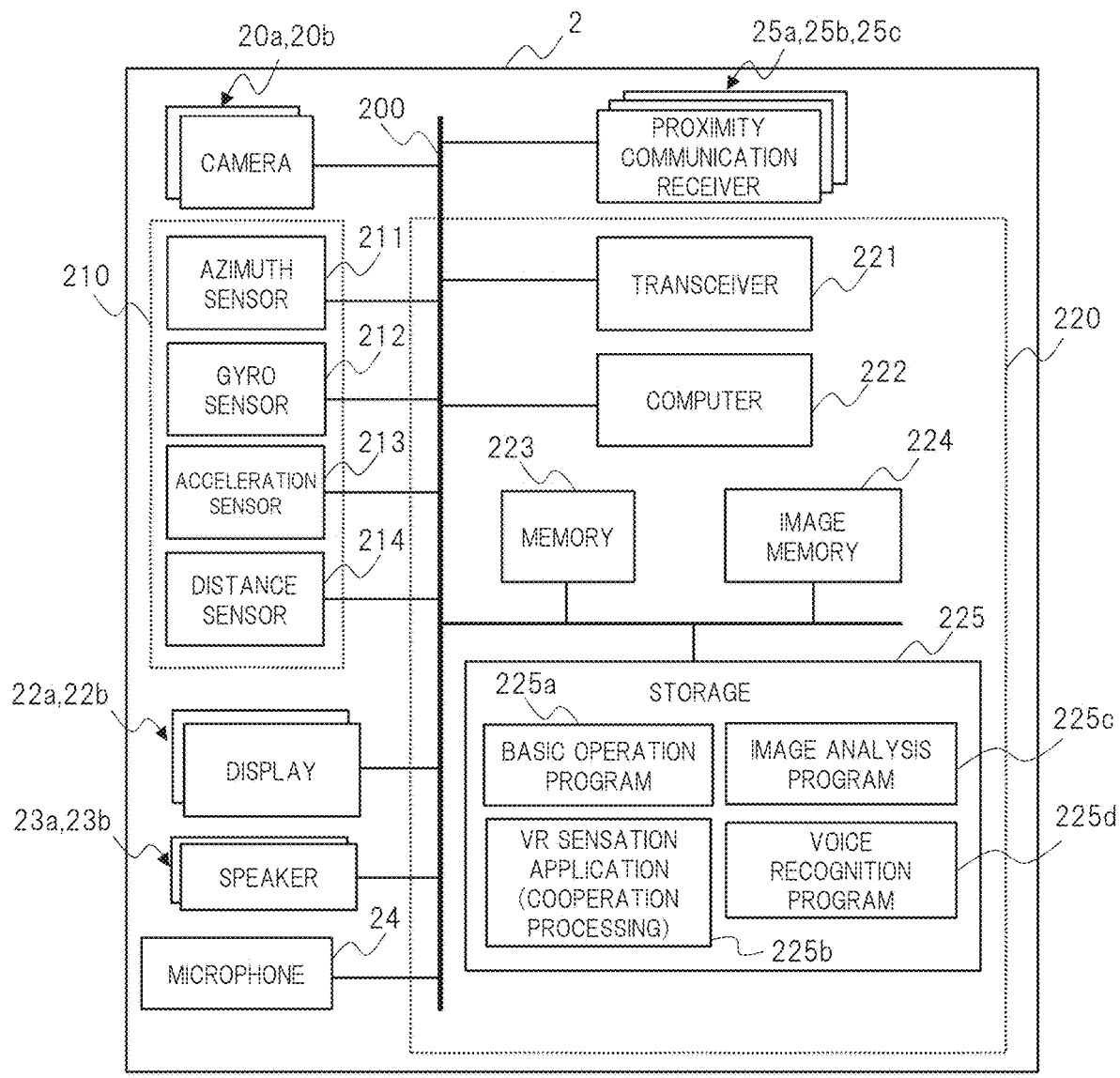
FIG. 3A is a block diagram showing one example of the head mounted display according to the first embodiment of the present invention.

FIG. 2 is an external view showing one example of the head mounted display according to the first embodiment of the present invention. FIG. 3A is a block diagram showing one example of the head mounted display according to the first embodiment of the present invention.

As shown in FIG. 2, the head mounted display 2 includes cameras 20a and 20b, displays 22a and 22b, speakers 23a and 23b, a microphone 24, proximity communication receivers (receivers) 25a, 25b, and 25c, a sensor group 210, and a controller 220. These elements are connected to each other via an internal bus 200.

The head mounted display 2 also includes holders 26a and 26b. The user 1 wears the head mounted display 2 by using the holders 26a and 26b. The head mounted display 2 is fixed onto a head by the holder 26a, and is fixed onto a nose by the holder 26b.

The cameras 20a and 20b are attached so as to photograph a front of the head mounted display 2, that is, a line-of-sight direction of the user 1. In FIG. 2, the camera 20a is arranged at a position corresponding to a left eye of the user 1, and the camera 20b is arranged at a position corresponding to a right eye of the user 1. Although the two cameras are provided here, three or more cameras may be provided. The cameras 20a and 20b image the line-of-sight direction of the user 1, and output captured image data to the controller 220 via the internal bus 200.

The sensor group 210 includes, for example, an azimuth sensor 211, a gyro sensor 212, an acceleration sensor 213, a distance sensor 214, a position sensor (not shown), and the like as shown in FIG. 3A. Based on sensing results of these sensors, a position of the head mount display device 2 (that is, the user 1), a posture of the user 1 (for example, head's tilt etc.), the line-of-sight direction of the user 1, a motion (change) of the line-of-sight direction of the user 1, and the like are detected. Each sensor outputs the sensing results to the controller 220 via the internal bus 200.

The distance sensor 114 is a sensor that measures a distance from the head mounted display 2 (that is, the user 1) to the information processor 3 which is an object. Any sensor capable of three-dimensionally estimating a position of the object can be used as the distance sensor 214. For example, as the distance sensor 214, three-dimensional distance sensors such as LiDAR (Light Detection And Ranging) and TOF (Time of Flight) sensors are raised. Incidentally, as shown in FIGS. 2 and 3A, when the head mounted display 2 is provided with a proximity communication receiver for distance measurement, the distance sensor 214 may be unnecessary.

The displays 22a and 22b display contents such as VR contents (VR images) and guidance contents (guidance images) of the head mounted display 2, for example. The displays 22a and 22b are of a non-transmissive type, and are configured by, for example, display panels (for example, curved panels or flat panels) such as liquid crystal or organic EL (Organic Electro-Luminescence), lenses, and the like. The display 22a is a display corresponding to a left eye of the user 1, and the display 22b is a display corresponding to a right eye of the user. The displays 22a and 22b input displayed image data (for example, VR image data, and guidance image data, etc.) outputted from the controller 220 via the internal bus 200, and display the VR contents and the like corresponding to the respective eyes of the user 1, respectively.

The speakers 23a and 23b input output sound data outputted from the controller 220 via the internal bus 200 and, based on the output sound data, output VR contents (VR audio), guidance contents for the head mounted display 2 (guidance voice), various sounds such as operation sounds. The speaker 23a is a speaker corresponding to a left ear of the user 1, and the speaker 23b is a speaker corresponding to a right ear of the user 1. The speakers 23a and 23b output sounds corresponding to the respective ears of the user 1, respectively.

The microphone 24 acquires sounds such as voices emitted by the user and environmental sounds, and outputs the acquired sounds as input sound data to the controller 220 via the internal bus 200.

The proximity communication receivers 25a, 25b, and 25c are receivers that receive proximity communication signals (position detection signals) transmitted from the information processor 3. The proximity communication receivers 25a, 25b, and 25c output the received proximity communication signals to the controller 220 via the internal bus 200. The proximity communication signal is used for information and data communication with other devices such as the information processor 3 and for measuring the distance from the head mounted display 2 (that is, the user 1) to the information processor 3.

The controller 220 is a functional block that controls each element included in the head mounted display 2 and performs an image analysis processing, a voice recognition processing, and the like. As shown in FIG. 3A, the controller 220 includes a transceiver 221, a computer 222, a memory 223, an image memory 224, a storage 225, and the like. The respective elements in controller 220 are connected to each other via the internal bus 200

The transceiver 221 covers multiple communication methods such as Wi-Fi (registered trademark), fourth generation (4G) and fifth generation (5G) mobile communication, selects an appropriate communication method, and is connected to the network 6 and the information processor 3. The transceiver 221 may also have a proximity communication function. In this case, the transceiver 221 may include a proximity communication receiver for data reception separately from the proximity communication receivers 25a to 25c for distance measurement, or the proximity communication receivers 25a to 25c may be used for data reception.

Also, the transceiver 221 may have a configuration capable of proprietary connection with the VR service server 7.

The computer 222 is configured by a processor such as a CPU (Central Processing Unit). The computer 222 reads out and executes various programs held in the memory 223 and fulfills functional blocks for performing various processings on the computer 222. The computer 222 also accesses the memory 223 and the image memory 224 to write and read programs and data. The computer 222 may include a graphics processor that primarily performs image processings.

The memory 223 is, for example, a volatile memory such as a RAM (Random Access Memory). The memory 223 temporarily holds various programs that are read from the storage 225 and are expanded. The memory 223 also holds various pieces of data such as parameters used in various programs, calculation results in the computer 222, and the like. The memory 223 outputs and holds various pieces of information such as program data and calculation results based on instructions from the computer 222 or the functional blocks realized on the computer 222, for example.

The image memory 224 is, for example, a volatile memory such as a RAM, and primarily temporarily holds various pieces of data (for example, displayed image data, captured image data, etc.) about image processings. The image memory 224 also primarily outputs and holds various pieces of data about image processings based on instructions from the computer 222 or functional blocks realized on the computer 222, for example. Although the image memory 224 is provided separately from the memory 223 in FIG. 3A, the image memory 234 may be provided in the memory 223. In this case, the memory 233 temporarily holds various pieces of data about the image processings.

The controller 220 measures (calculates) the distance from the head mounted display 2 to the information processor 3 by using the respective proximity communication signals received by the proximity communication receivers 25a, 25b, and 25c. For example, the controller 220 performs a processing such as detection of respective phase differences among the proximity communication receivers 25a, 25b, and 25c based on the proximity communication signals inputted from the proximity communication receivers 25a, 25b, and 25c, thereby estimating the distance between the head mounted display 2 and the information processor 3. Further, the controller 220 can detect a three-dimensional position of the information processor 3 by using the respective proximity communication signals received by the proximity communication receivers 25a, 25b, and 25c.

By providing three or more proximity communication receivers, the controller 220 can estimate the three-dimensional position of the object. Note that when the distance to the information processor 3 is not estimated, the plurality of proximity communication receivers 25a to 25c may not be provided.

The controller 220 outputs the output sound data to the speakers 23a and 23b. The controller 220 also performs an analysis processing of the captured images by the cameras 20a and 20b and a recognition processing of voices acquired by the microphone 24. The controller 220 also performs processings of the network communication, the proximity communication, and the like.

The storage 225 includes a non-volatile memory such as a flash memory. The storage 225 includes, for example, respective storage regions such as a storage region 225a that stores a basic operation program for performing basic control of the head mounted display 2, a storage region 225b that stores a cooperation processing program for linking the head mounted display 2 and the information processor 3, a storage region 225c that stores an image analysis program, and a storage region 225d that stores a voice recognition program. The program stored in each storage region is developed in the memory 223 and executed by the computer 222. Consequently, each functional block is realized on the computer 222.

The content images displayed on the displays 22a and 22b are primarily VR images, but in the present embodiment, the image etc. of the information processor 3 cut out from the captured image of the camera may be superimposed on the VR image. The image data of these images is held in, for example, the image memory 224, is read out from the image memory 224 by the instruction from the controller 220, and is outputted to the display 22.

<<Another Configuration Example of Head Mounted Display>>

Figure 3B:
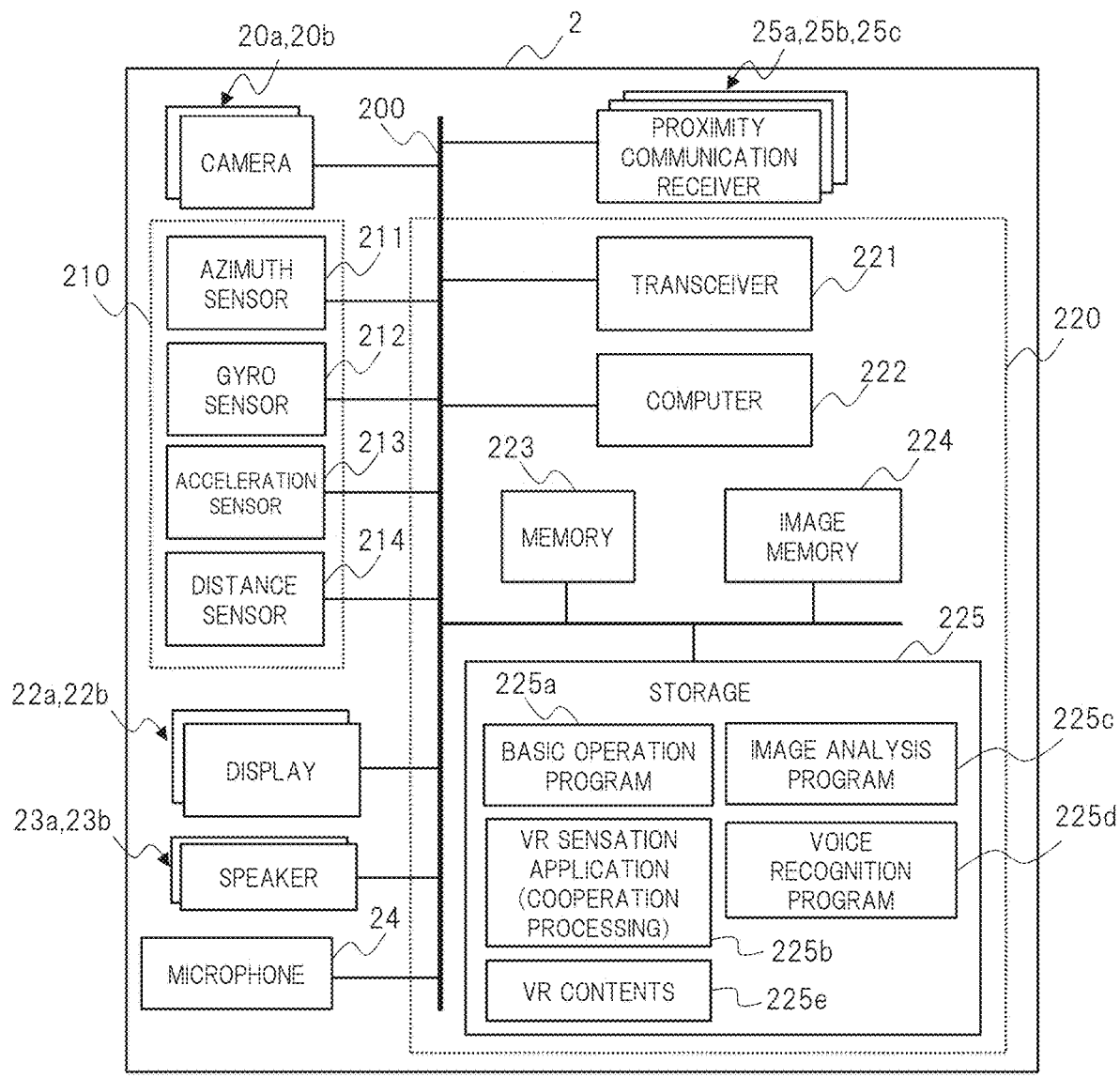
FIG. 3B is a block diagram showing another example of the head mounted display according to the first embodiment of the present invention.

FIG. 3B is a block diagram showing another example of the head mounted display according to the first embodiment of the present invention. In FIG. 3B, the same elements as those in FIG. 3A are given the same reference numerals, and a description of portions overlapping with those in FIG. 3A will be omitted. FIG. 3B differs from FIG. 3A in that the storage 225 is provided with a storage region 225e for storing VR contents.

In a configuration of FIG. 3B, the transceiver 221 downloads the VR contents (images, sounds) from the VR service server 7 via the network 6 under the control of the computer 222. The computer 222 stores the downloaded VR contents in the storage region 225e of the storage 225.

The computer 222 reads the VR contents from the storage region 225e as necessary, outputs the VR images to the displays 22a and 22b, and outputs the VR sounds to the speakers 23a and 23b, thereby allowing the user 1 to experience the VR contents. Then, the computer 222 performs an update processing of the VR images and the VR sound according to the motion of the user 1.

<Information Processor>

Figure 4:
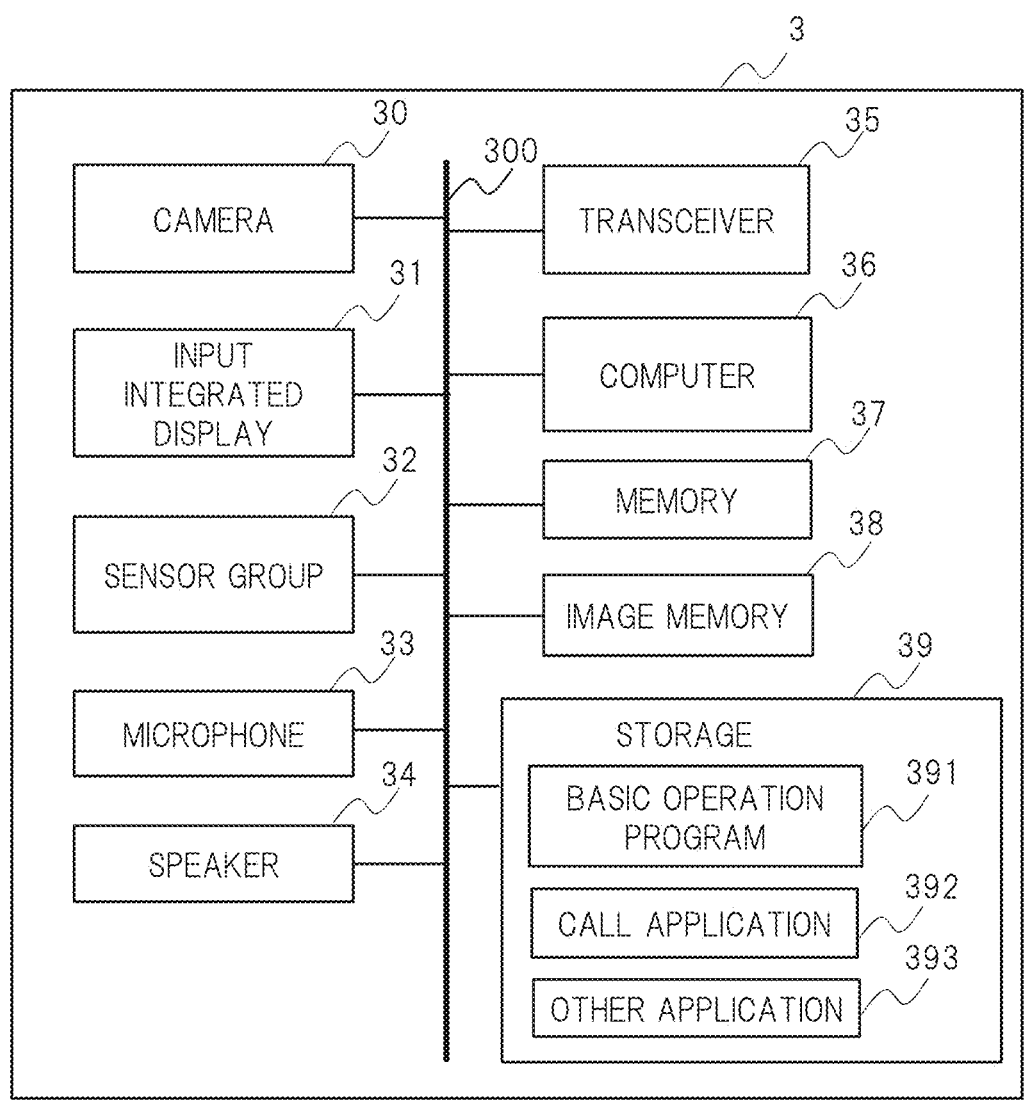
FIG. 4 is a block diagram showing one example of a configuration of an information processor.

Next, the information processor will be described. FIG. 4 is a block diagram showing one example of a configuration of the information processor. In FIG. 4, a configuration of the information processor 3 will be described by using a smartphone as an example. The information processor 3 illustrated in FIG. 4 includes a camera 30, an input integrated display 31, a sensor group 32, a microphone 33, a speaker 34, a transceiver 35, a computer 36, a memory 37, an image memory 38, and a storage 39.

The camera 30 is provided, for example, on a surface opposite to the input integrated display 31. The camera 30 may also be provided on an input integrated display 31 side. The camera 30 outputs the captured image data to the computer 36, the storage 39, or the like via an internal bus 300.

The input integrated display 31 is a display with an input function by a so-called touch operation. The input integrated display 31 displays, for example, an operation screen of the information processor 3, an incoming call screen, a captured image, and the like. An operation of the information processor 3 is performed by the touch operation via the input integrated display 31.

The sensor group 32 includes, for example, an azimuth sensor, a gyro sensor, an acceleration sensor, a position sensor (all not shown), and the like. A position and a posture of the information processor 3 are detected based on sensing results of these sensors. Each sensor outputs the sensing results to the computer 36 via the internal bus 300.

The microphone 33 acquires sounds such as voice emitted by the user and environmental sounds, and outputs the acquired sounds to the computer 36 as input sound data via the internal bus 300.

The speaker 34 inputs output sound data outputted from the computer 36 via the internal bus 300 and, based on the output sound data, outputs various sounds such as call voice, application voice, guidance voice of the information processor 3, an operation sound.

The transceiver 35 is connected to, for example, a fourth generation (4G) or fifth generation (5G) mobile communication network. Also, the transceiver 35 is connected to the network 6 and the head mounted display 2 via Wi-Fi (registered trademark) or the like, for example. The transceiver 35 also has a proximity communication function and transmits the proximity communication signal to the head mounted display 2.

The computer 36 is configured by a processor such as a CPU, for example. The computer 36 reads out and executes various programs held in the memory 37 and fulfills functional blocks for performing various processings on the computer 36. The computer 36 also accesses the memory 37 and the image memory 38 to write and read the programs and the data.

The memory 37 is, for example, a volatile memory such as a RAM. The memory 37 temporarily holds various programs that are read from the storage 39 and are expanded. In addition, the memory 37 holds respective pieces of data such as parameters in used in various programs, calculation results in the computer 36, and the like. The memory 37 outputs and holds various pieces of information such as program data and calculation results based on instructions from the computer 36 or functional blocks realized on the computer 36, for example.

The image memory 38 is, for example, a volatile memory such as a RAM, and primarily temporarily holds various pieces of data about image processings (for example, displayed image data, captured image data, and the like). The image memory 38 also primarily outputs and holds various pieces of data about image processings based on instructions from the computer 36 or functional blocks realized on the computer 36, for example. As shown in FIG. 4, the image memory 38 may be provided separately from the memory 37, or the image memory 38 may be provided in the memory 37. In this case, the memory 37 temporarily holds the various pieces of data about the image processings.

The storage 39 includes a non-volatile memory such as flash memory, for example. As shown in FIG. 4, the storage 39 includes, for example, a storage region 391 that stores basic operation programs, a storage region 392 that stores call applications, and a storage region 393 that stores other applications such as SNS applications.

<Processing Flow in Starting Use of Information Processor>

The head mounted display 2 of the present embodiment superimposes the image of the information processor on the VR content image, thereby causing the user 1 experiencing the VR contents to use the information processor 3.

Figure 5:
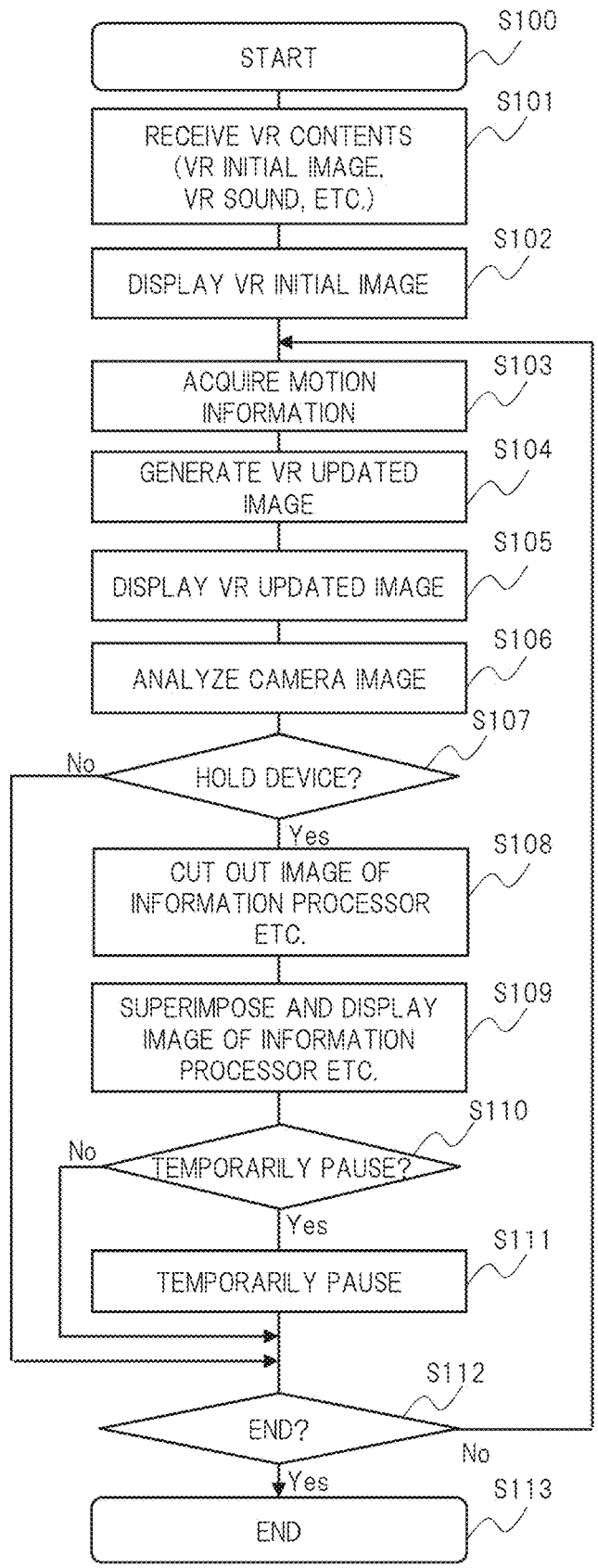
FIG. 5 is a flow diagram showing one example of an processing when a user experiencing VR contents uses the information processor.

FIG. 5 is a flow diagram showing one example of a cooperative processing by a VR sensation application according to the first embodiment of the present invention. FIG. 5 shows one example of a processing when the user experiencing the VR contents uses the information processor. When the VR sensation application is activated and a processing is started (step S100), the controller 220 transmits the network signal 4a from the transceiver 221 to access the VR service server 7 (step S101). At this time, the network signal 4a includes various pieces of information such as address information of the VR service server 7 on the network and VR content specifying information designating the VR contents that the user wants to download. When accessed by the head mounted display 2 (controller 220), the VR service server 7 transmits the predetermined VR contents designated by the VR content specifying information to the head mounted display 2.

When receiving the VR contents, the controller 220 stores the received VR contents in the memory 223 or the image memory 224, for example. Note that if the storage 225 is provided with the storage region 225e (FIG. 3B) for storing the VR contents, the controller 220 may cause the storage region 225e to store the received VR contents. Further, in this case, the VR contents may be downloaded in advance and cause the storage region 225e to be stored, and the predetermined VR contents may be read out from the storage region 225e in staring the use of the head mounted display 2. In this case, a processing of step S101 is performed only when the necessary VR contents are not stored.

Next, in step S102, the predetermined VR contents are outputted to provide the user 1 with the VR contents. The controller 225 outputs VR initial image data (VR image data) at the start of the VR contents to the displays 22a and 22b, and displays VR initial images (VR images) on the displays 22a and 22b, respectively. The controller 225 also outputs the VR sound data to the speakers 23a and 23b, and causes the speakers 23a and 23b to output the VR sounds corresponding to the VR images, respectively.

Next, in step 103, the controller 220 continues to acquire motion information of the head mounted display 2, that is, motion information of the user 1 based on sensing information of each sensor of the sensor group 210. Then, in step S104, the controller 220 generates VR updated image data (VR image data) based on the motion information acquired in step S103.

Then, in step S105, the controller 220 outputs the VR updated image data generated in step S104 to the displays 22a and 22b, and causes the displays 22a and 22b to display the VR updated images (VR images) in accordance with a visual field, the line-of-sight direction, inclination of the head and body, and the like of the user 1, respectively.

Next, in step S106, analysis (image analysis) of captured image data inputted from the cameras 20a and 20b is performed. The controller 220 analyzes the captured image data and extracts the information processor 3. Also, the controller 220 may extract the hand of the user 1 from the captured image data. Note that the analysis of the imaging by the cameras 20a and 20b and the analysis of the captured image data may be performed asynchronously.

In step S107, it is determined whether the user 1 is holding the information processor 3 based on the analysis results of the captured image data in step S106. Specifically, in step S107, it is determined whether the user 1 has moved the information processor 3 in front of the camera 20a or the camera 20b. When it is difficult to detect the hand of the user 1 in the image analysis, the controller 220 may determine whether the user 1 is caused to move the information processor 3 in front of the camera by whether the information processor 3 has been photographed in the captured images.

Further, the controller 220 may detect that the user 1 has moved the information processor 3 by recognizing, from the captured image, that the images to be displayed are displayed when the information processor 3 senses vibration by a vibration sensor or the like.

Alternatively, the controller 220 may determine whether the user 1 has moved the information processor 3 in front of the camera by combining the position of the information processor 3 in the captured image and the line-of-sight direction of the user 1 that have been extracted based on the sensing results. In this case, the controller 220 may determine that the user 1 has moved the information processor 3 in front of the camera if the line of sight of the user 1 is directed toward the information processor 3, or may determine that the user 1 has not moved the information processor 3 in front of the camera if the line of sight of the user 1 is not directed to the information processor 3.

As described above, when an intention for the user 1 to want to control the information processor 3 is not grasped, for example, the images are not displayed on the head mounted display 2 even if the information processor 3 is left on a desk and the information processor 3 is extracted in the captured image, so that content viewing by the user 1 is not disturbed.

When the user 1 holds the information processor 3, that is, when it is determined that the user 1 has moved the information processor 3 in front of the camera (Yes), the controller 220 performs a processing of step S108. In step 108, the controller 220 cuts out the image of the information processor 3 from the captured images, and generates image data of the information processor 3. Further, when display screen data of the information processor 3 can be acquired by requesting the information processor 3 to transmit the display screen data, the display screen data is transformed so as to match the display screen of the image data of the information processor 3 and are superimposed on the image data of the information processor 3. Note that in order to acquire the display screen data of the information processor 3, it is assumed that device registration and authentication have been performed in advance between the information processor 3 and the head mounted display 2, and the mutual authentication is performed by proximity wireless communication or the like.

In step S109, the controller 220 superimposes the image data of the information processor 3 generated in step S108 on the VR images. Specifically, the controller 220 synthesizes the image data of the information processor 3 generated in step S108 and the VR updated image data (VR image data) to generate synthetic image data. Then, the controller 220 outputs the generated synthetic image data to the displays 22a and 22b, and causes the displays 22a and 22b to display synthetic images which superimposes the VR images and the image of the information processor 3. Consequently, the user can visually recognize and start the use of the information processor 3 while experiencing the VR contents.

In step S110, it is determined whether the user 1 has given an instruction to pause a progress of the VR contents. If the user 1 has given the instruction to pause the progress of the VR contents (Yes), the controller 220 proceeds to step S111 and pauses the progress of the VR contents. This allows the user 1 to concentrate on the information processor 3 and use it. Then, when the user 1 gives an instruction to restart the progress of the VR contents, the progress of the VR contents is restarted and a processing of step S112 is performed.

In contrast, in step S110, if the user 1 has not given an instruction to pause the progress of the VR contents (No), the user 1 uses the information processor 3 while the VR contents are progressing.

In step S112, the controller 220 performs end judgement of the VR sensation application that executes the VR contents. The end judgement of the VR sensation application may be determined based on whether an end instruction by the user 1 has been present or absent or may be determined based on whether the VR contents have ended.

When the VR sensation application is to be continued (No), a processing returns to step S103 and the processings of steps S103 to S112 are performed again. Meanwhile, when the VR sensation application is ended (Yes), the controller 220 ends the VR sensation application (step S113).

Meanwhile, in step S107, when the user 1 does not hold the information processor 3, that is, when the controller 220 determines that the user 1 has not moved the information processor 3 in front of the camera (No), the processing moves to S112. The subsequent processings are performed as already described.

By the way, in step S111, the user 1 may not give an instruction to restart the progress of the VR contents. Therefore, between steps S111 and S112, the controller 220 may provide a step of superimposing a guidance image for restarting the progress of the VR contents on the VR images and the image of the information processor 3. Further, a time after the user 1 stops the progress of the VR contents is counted, and when the time exceeds a predetermined time, the progress of the VR contents may be forcibly restarted. Furthermore, a time after the user 1 stops the progress of the VR contents is counted, and when the time exceeds a predetermined time, the processing may move to step S113 and end the VR sensation application.

<<Specific Example of Displayed Image>>

Figure 6:
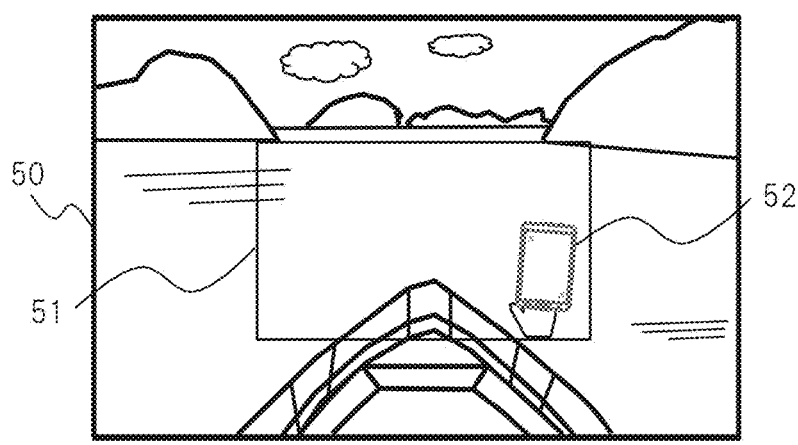
FIG. 6 is a diagram showing a first example of a displayed image of the head mounted display in which a VR image and an image of the information processor are superimposed.

Here, a specific example of a displayed image displayed on the head mounted display 2 will be described. FIG. 6 is a diagram showing a first example of a displayed image of the head mounted display in which the VR images and the image of the information processor are superimposed. FIG. 6 shows a VR image 50, a capturing range 51 of the cameras 20a and 20b, and an image 52 of the information processor 3. Note that although the capturing range 51 is illustrated for explanation, it is not displayed on the head mounted display 2.

The controller 220 recognizes the information processor 3 within the capturing range 51 by analyzing the captured image data, and extracts the image 52 of the information processor 3 (which may include the hand of the user holding it) from the captured image. Then, the controller 220 superimposes the captured image 52 of the information processor 3 on the VR image. Note that the present invention can also be applied to a transmissive head mounted display, and if the transmissive head mounted display 2 is adopted, the controller 220 transparentizes a VR image of a region corresponding to the image 52 of the information processor 3 and may not display the VR image of the region that has been transparentized.

In addition, the controller 220 may not display the hand of the user 1 holding the information processor 3, or may replace the hand with another image, such as a graphic image generating the hand of the user 1. The user 1 can confirm that the information processor 3 has been recognized by the head mounted display 2, and can further perform various operations such as authentication while viewing the image 52 of the information processor 3. Note that in operating the information processor 3, the operation may often be performed with a finger(s) of a hand opposite to the hand by which the user 1 holds it, so that by displaying an image(s) and the like of the opposite hand and its finger in addition to the hand holding the information processor 3, an effect of facilitating the operation can be expected.

Figure 7:
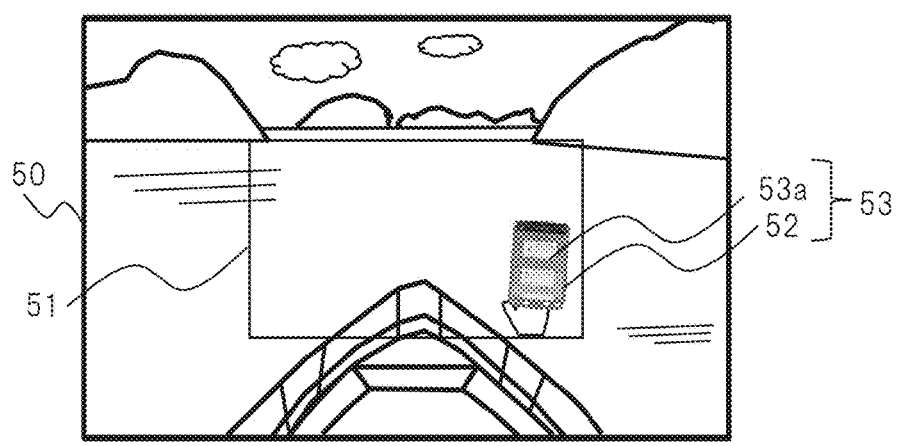
FIG. 7 is a diagram showing a second example of the displayed image of the head mounted display in which the VR image and the image of the information processor are superimposed.

FIG. 7 is a diagram showing a second example of the displayed image of the head mounted display in which the VR images and the image of the information processor are superimposed. In FIG. 7, an overlay image 53 of the information processor 3 in which the image 52 of the information processor 3 in FIG. 6 and the displayed image 53a of the information processor 3 are superimposed is displayed. At this time, the image of the hand of the user 1 is displayed in consideration of a position relationship with the information processor 3.

The controller 220 acquires the displayed image data related to the displayed image from the information processor 3 by the network communication or the proximity communication, for example. Here, it is assumed that the head mounted display 2 and the information processor 3 have been authenticated, and communication between them has been established. When transmission of the display screen data from the head mounted display 2 to the information processor 3 is requested, the information processor 3 transmits the displayed image data to the head mounted display 2.

The controller 220 generates the synthetic image data by superimposing the VR image data, the image data of the information processor 3, and the received displayed image data. Then, the controller 220 outputs the generated synthetic image data to the displays 22a and 22b, and outputs the synthetic images obtained by superimposing the VR images 50, the image 52 of the information processor 3, and the displayed image 53a to the displays 22a and 22b, respectively. Here, the synthetic image obtained by superimposing the image 52 of the information processor 3 and the displayed image 53a is the overlay image 53 of the information processor 3.

The head mounted display 2 acquires the latest displayed image of the information processor 3 by acquiring the displayed image of the information processor 3 while recognizing the information processor 3 in the captured image.

As described above, in the example of FIG. 7, the displayed image 53a generated from the displayed image data of the information processor 3 is used instead of the displayed image imaged by the camera. This makes it possible to improve definition of the displayed image in the synthetic image.

Note that when it is difficult to recognize the hand of the user 1, the controller 220 displays a lock image of the information processor 3 by, for example, an operation of lifting the information processor 3, determinates that the user 1 holds the information processor 3 and performs a lock screen display operation, and may recognize that the user 1 has picked up the information processor 3.

Figure 8:
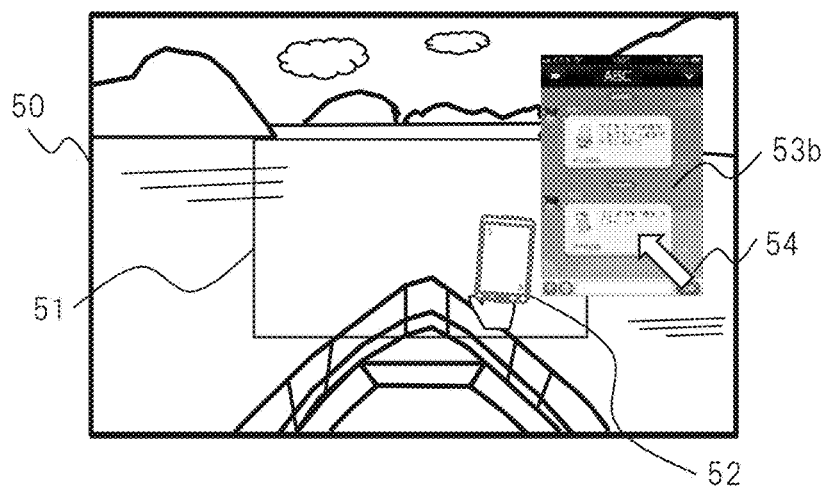
FIG. 8 is a diagram showing a third example of the displayed image of the head mounted display in which the VR image and the image of the information processor are superimposed.

FIG. 8 is a diagram showing a third example of the displayed image of the head mounted display in which the VR images and the image of the information processor are superimposed. In FIG. 8, in order to make the displayed image of the information processor 3 easier to see, an enlarged displayed image 53b of the displayed image 53a of the information processor 3 is displayed near the image 52 of the information processor 3 (on a right side in FIG. 8). A displayed position of the enlarged displayed image 53b is not limited to the right side of the image 52. Moreover, a size of the enlarged displayed image 53b is arbitrary, and can be changed to a size that is easy for the user 1 to see. The displayed position and the size may be controllable when the user 1 intends to change the displayed position by moving the information processor 3 right, left, up, and down and the size by moving it back and forth. Also, FIG. 8 shows an example in which an operation pointer 54 is superimposed on the information processor 3 corresponding to the finger operated by the user 1.

<Others>

In the present embodiment, for example, when the information processor 3 moves out of a capturing range of the camera due to the user 1 lowering the hand, the images (52, 53, 53b) of the information processor 3 may be erased from the synthetic image, or the display may be continued until an instruction to erase the images (52, 53, 53b) of the information processor 3 is given by the user 1.

Further, for example, if the head mounted display 2 and the information processor 3 have already been mutually approved and the information processor 3 can be authenticated from the head mounted display 2, the controller 220 determines that the user 1 is holding the information processor 3 and performing a lock screen display operation by, for example, an operation of lifting the information processor 3 and may request the transmission of the displayed image data to the information processor 3 even when the information processor 3 is not confirmed by the captured image of the camera.

Main Effects Due to Present Embodiment

According to the present embodiment, the user 1 can pick up and use the external information processor 3 without attaching and detaching the head mounted display 2 even when experiencing immersive contents such as VR contents.

Further, according to the present embodiment, the displayed image 53a of the information processor 3 can be superimposed on the VR images, so that the definition of the displayed image can be improved.

Furthermore, according to the present embodiment, the enlarged displayed image 53b of the information processor 3 can be superimposed on the VR images, so that the visibility of the displayed image can be improved.

As described above, the functions that are considered to be particularly effective while the user 1 is experiencing the VR contents have been described as an example. However, in the HMD having the non-transmissive display, regardless of a content of the contents in such a situation as not to see a periphery at a time of wearing it, the present invention can obtain the same effect even when the menu is displayed or nothing is displayed. In the transmissive display, the present invention is effective while displaying contents or the like that greatly obstructs a field of view.

Second Embodiment

Next, a second embodiment will be described. In the present embodiment, a processing when an incoming call is received by the information processor 3 while the user 1 is experiencing the VR contents will be described.

Figure 9:
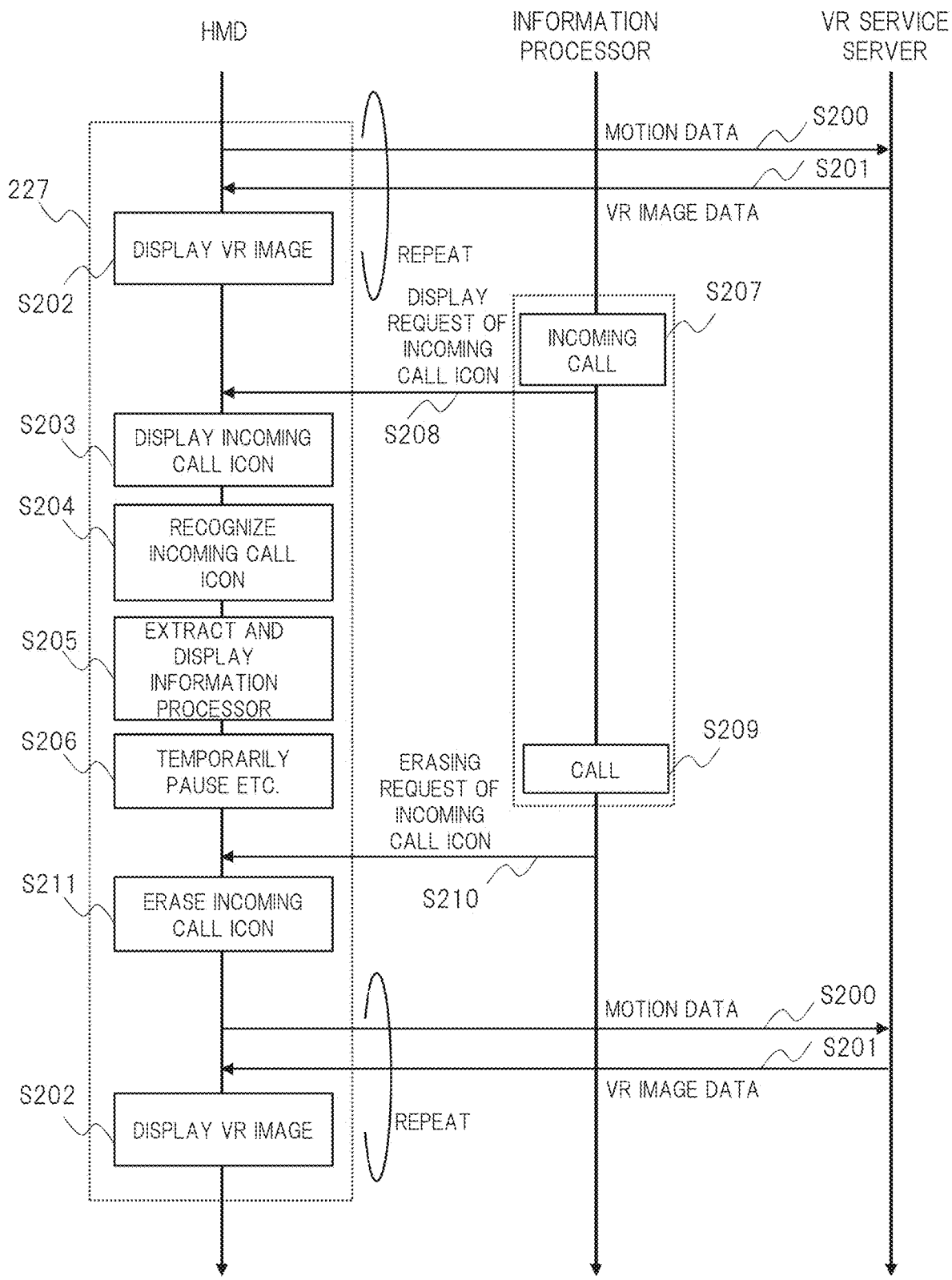
FIG. 9 is an operation sequence diagram showing one example of a processing at a time of getting an incoming call according to a second embodiment of the present invention.

FIG. 9 is an operation sequence diagram showing one example of processings at a time of receiving an incoming call according to the second embodiment of the present invention. FIG. 9 shows an interrupt sequence and the like that presents the use of the information processor 3 to the user 1 when the incoming call comes to the information processor 3. Specifically, FIG. 9 shows an operation sequence diagram for causing the user 1 to start using the information processor 3 by considering as a trigger the following: that the information processor 3 receives an incoming call while the user 1 is experiencing the VR contents and that the information processor 3 notifies the head mounted display 2 of the incoming call.

FIG. 9 shows a relationship among the head mounted display 2, the information processor 3, and the VR service server 7. While the user 1 is experiencing the VR contents, the head mounted display 2 performs the cooperative processing by the VR sensation application 227.

The head mounted display 2 (controller 220) transmits the motion data of the head mounted display 2 detected based on, for example, the sensing results and the like to the VR service server 7 (step S207). Upon receiving the motion data from the head mounted display 2, the VR service server 7 transmits the image data of the VR images updated along with the motion to the head mounted display 2 (step S201).

When receiving the VR imaged data for updating from the VR service server 7, the head mounted display 2 displays on the displays 22a and 22b the VR updated images based on the VR imaged data for updating (step S202). Steps S200 to S202 are repeatedly performed.

When the information processor 3 receives the incoming call, the information processor 3 activates a call application and becomes an incoming call status (step S207). Then, the information processor 3 transmits to the head mounted display 2, as an interrupt request, a display request of an incoming call icon indicating that there is the incoming call (step S208).

In step S203, when the head mounted display 2 receives the display request of the incoming call icon, it reads the imaged data of the incoming call icon held in, for example, the memory 223 and the image memory 224 and generates the synthetic image data that synthesizes the VR image data for updating and the image data of the incoming call icon. Then, based on the synthetic image data, the head mounted display 2 causes the displays 22a and 22b to display the synthetic image in which the incoming call icon is superimposed on the VR images.

Figure 10:
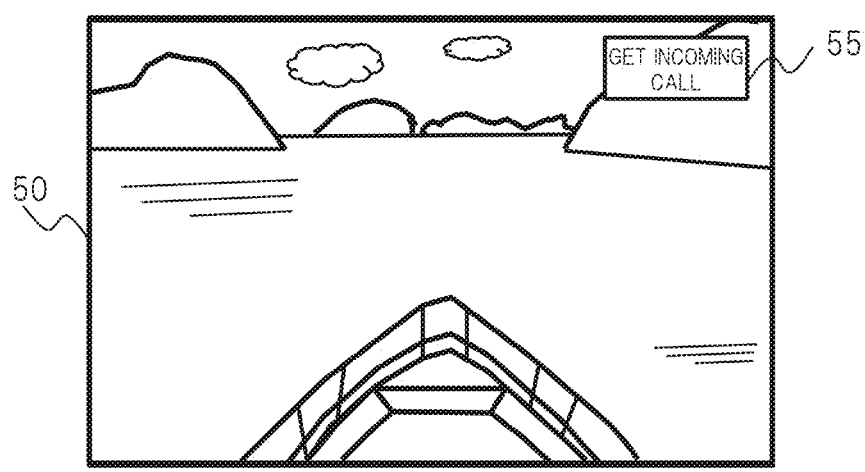
FIG. 10 is a diagram showing one example of a displayed image at the time of getting the incoming call.

FIG. 10 is a diagram showing one example of a displayed image when receiving the incoming call. FIG. 10 shows a synthetic image in which the VR images 50 and the incoming call icon 55 are superimposed. As shown in FIG. 10, the incoming call icon 55 is superimposed on a partial region of the VR images 50. A displayed location of the incoming call icon 55 is not limited to an example of FIG. 10.

When recognizing the incoming call icon 55, the user 1 moves the information processor 3 to the front of the head mounted display 2 (S204). The recognition of the incoming call icon 55 is made, for example, by detecting motion of the finger of the user 1 through the analysis of the captured image and by comparing the detected motion of the finger with a predetermined motion pattern. Alternatively, the recognition of the incoming call icon 55 may be made by acquiring vocalization of the user 1 with the microphone 24 and comparing the vocalization of the user 1 with a predetermined vocalization pattern.

Then, the head mounted display 2 analyzes the captured image data, extracts the information processor 3, and superimposes the image of the information processor 3 on the VR images, for example, as shown in FIGS. 6 to 8 (step S205). At this time, a processing such as pausing the progress of the VR contents may be performed (step S206).

Then, the user 1 makes a call by operating the information processor 3 (step S209). When the call ends, the information processor 3 transmits an erasing request of the incoming call icon to the head mounted display 2 (step S210). Note that step S211 may be performed at any timing after the start of the call.

When the head mounted display 2 receives the erasing request of the incoming call icon, it finishes synthesizing the VR image data for updating and the image data of the incoming call icon and erases the incoming call icon 55 displayed on the displays 22a and 22b (step S211).

Note that the displayed icon 55 may automatically erased by setting an icon display time in advance and when the icon display time elapses after the incoming call icon 55 is displayed. In this case, step S210 can be omitted. Step S211 in this case is performed at any timing after step S204 according to the icon display time.

Then, the head mounted display 2 erases and the like a temporary stop of the VR contents, executes steps S200 to S202, and restarts the progress of the VR contents.

Note that the present embodiment can be applied also to SNS applications, mail applications, and the like besides call applications. In this case, when the SNS application, the mail application, and the like receives an incoming call or a mail, the information processor 3 transmits the display request of the incoming call icon or the received icon.

The user 1 can pick up the information processor 3, confirm received contents of the SNS application, the mail application, and the like, and reply to the received contents.

According to the present embodiment, in addition to the effects of the first embodiment, it is possible to accept an interrupt from the information processor 3 even while the user 1 is experiencing the VR contents.

Third Embodiment

Next, a third embodiment will be described. In the present embodiment, it is assumed that the user 1 does not know a position of the information processor 3. In this case, the user 1 may not be able to operate the information processor 3 immediately after recognizing the incoming call from the incoming call icon 55. Therefore, in the present embodiment, a method of making the user 1 recognize the position of the information processor 3 when receiving the incoming call will be described.

Figure 11:
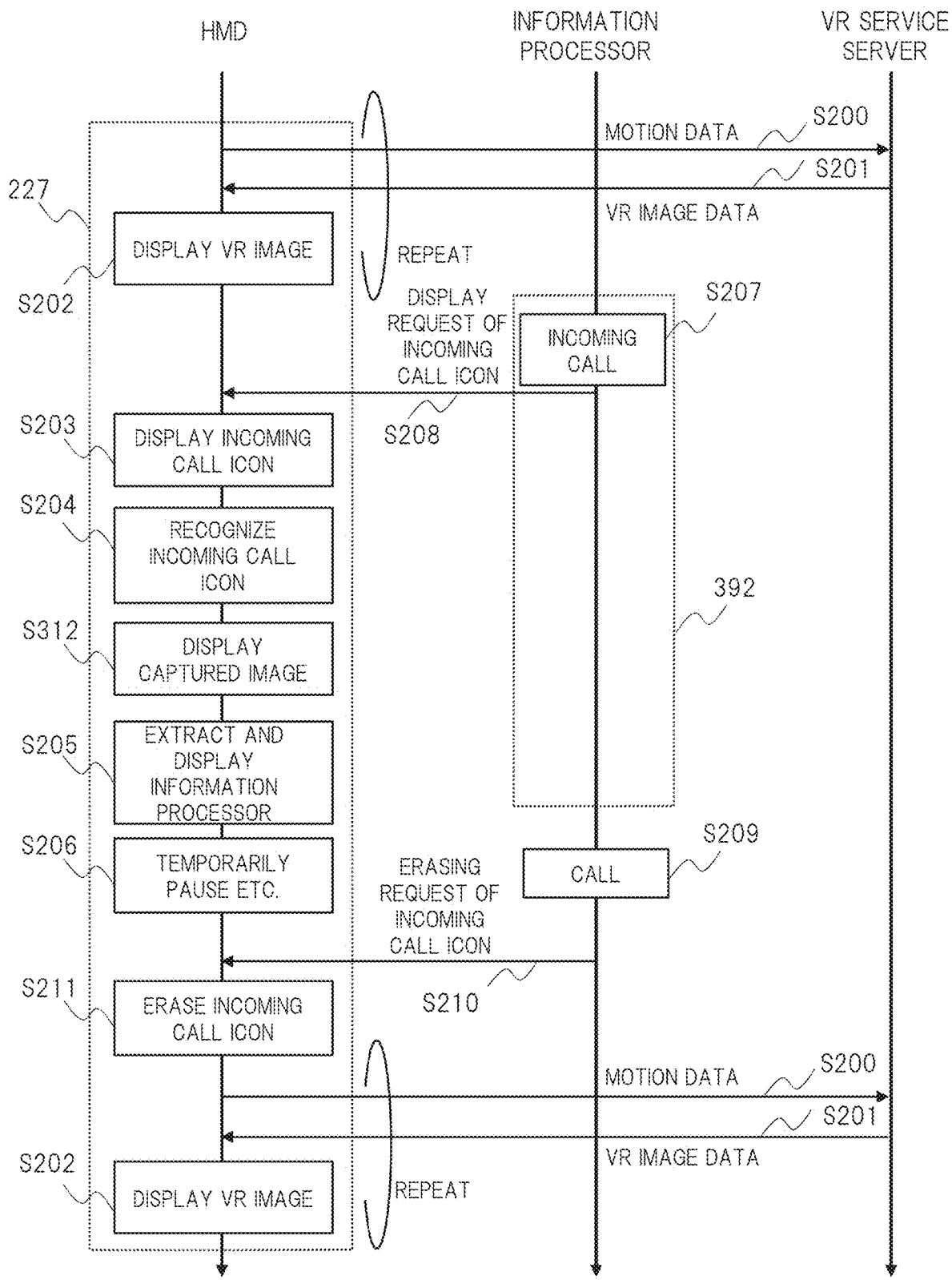
FIG. 11 is an operation sequence diagram showing one example of a processing at the time of getting an incoming call according to a third embodiment of the present invention.

FIG. 11 is an operation sequence diagram showing one example of a processing when receiving an incoming call according to a third embodiment of the present invention. FIG. 11 is similar to FIG. 9, but differs from FIG. 9 in that step S312 is added between steps S204 and S205.

When the user 1 recognizes the incoming call icon 55 in step S204, step S312 is executed. In step S312, the head mounted display 2 generates a synthetic image in which the captured images of the cameras 20a and 20b are further superimposed on the synthetic image superimposing the VR image and the incoming call icon 55, and causes the displays 22a and 22b to display the synthetic image on which the captured images are superimposed. When the synthetic image superimposing the captured image is displayed on the displays 22a and 22b, the user 1 searches for the information processor 3 while viewing the captured image superimposed on the VR image. When the user 1 recognizes the position of the information processor 3, the user 1 holds the information processor 3 by the hand and performs an operation such as an unlocking operation.

When the user 1 recognizes the position of the information processor 3 and holds the information processor 3 by the hand, step S205 is executed and the synthetic image superimposing the VR image and the image of the information processor 3 is displayed on the displays 22a and 22b.

<<Specific Example of Displayed Image>>

Here, a specific example of the displayed image displayed on the head mounted display 2 according to the present embodiment will be described.

<<Case where Information Processor Exists in Capturing Range>>

Figure 12A:
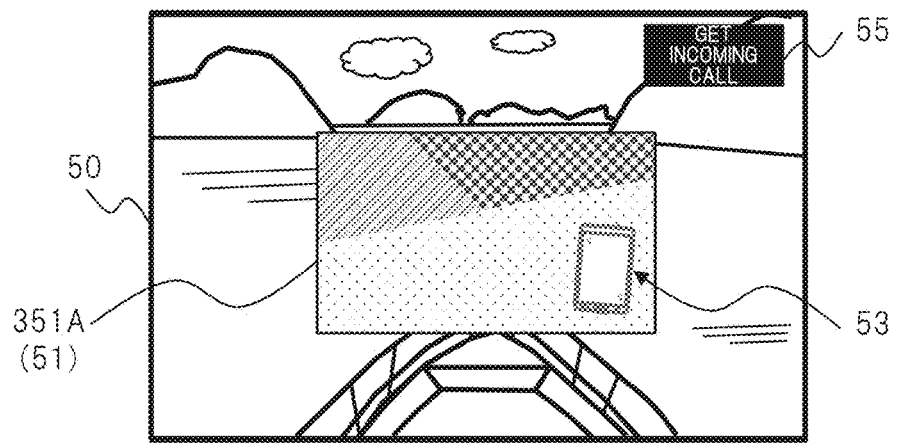
FIG. 12A is a diagram illustrating a displayed image when an information processor 3 is present within a capturing range of a camera.
Figure 12B:
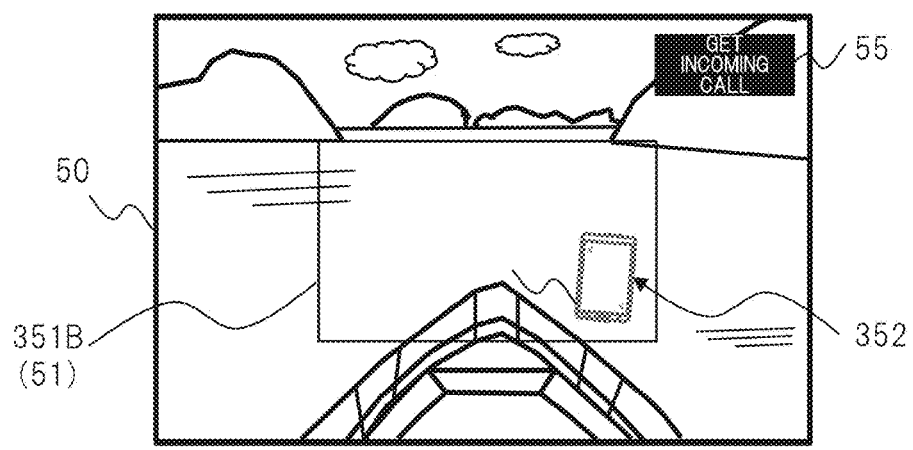
FIG. 12B is a diagram illustrating the displayed image when the information processor 3 is present within the capturing range of the camera.
Figure 12C:
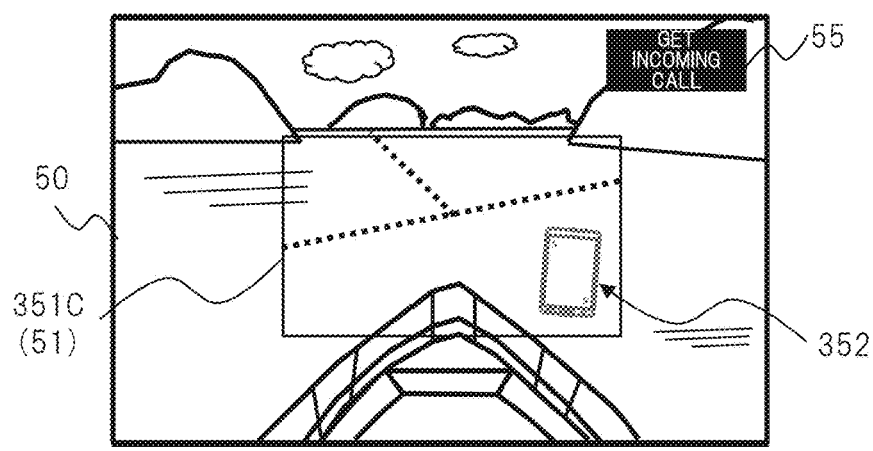
FIG. 12C is a diagram illustrating the displayed image when the information processor 3 is present within the capturing range of the camera.

First, a case where the information processor exists in the captured image of the camera will be described. FIGS. 12A, 12B, and 12C are diagrams illustrating displayed images when the information processor 3 exists in the capturing range of the camera. Note that the incoming call icon 55 is also superimposed on the displayed images of FIGS. 12A, 12B, and 12C.

First, in an example of FIG. 12A, the captured image of the camera is not processed, and an image on which a VR image 50 and an unprocessed captured image 351A are superimposed is displayed on the displays 22a and 22b. According to the example of FIG. 12A, it is possible to search for the information processor 3 without impeding visibility of the VR image 50 and preventing the visibility from being reduced.

Next, in an example of FIG. 12B, an image on which the VR image 50 and a transparentizing image 351B are superimposed is displayed on the displays 22a and 22b. The transparentizing image 351B is generated by performing a transparentizing processing for transparentizing making a region other than the information processor 3 with respect to the captured image. The image 352 of the information processor 3 is included in the transparentizing image 351B.

Then, in an example of FIG. 12C, an image on which the VR image 50 and a line drawing processed image 351C are superimposed is displayed on the displays 22a and 22b. The line-drawing processed image 351C is an image obtained by performing a line-drawing processing on the captured image. By performing edge detection on the line drawing processed image 351C, a shape processing device and the like are detected. In FIG. 12C, a broken line indicates a process in which the line drawing processing has been performed.

According to the examples of FIGS. 12B and 12C, it is possible to search for the information processor 3 without impeding the visibility of the VR image 50.

<<Case where Information Processor does not exist in Capturing Range>>

Figure 13A:
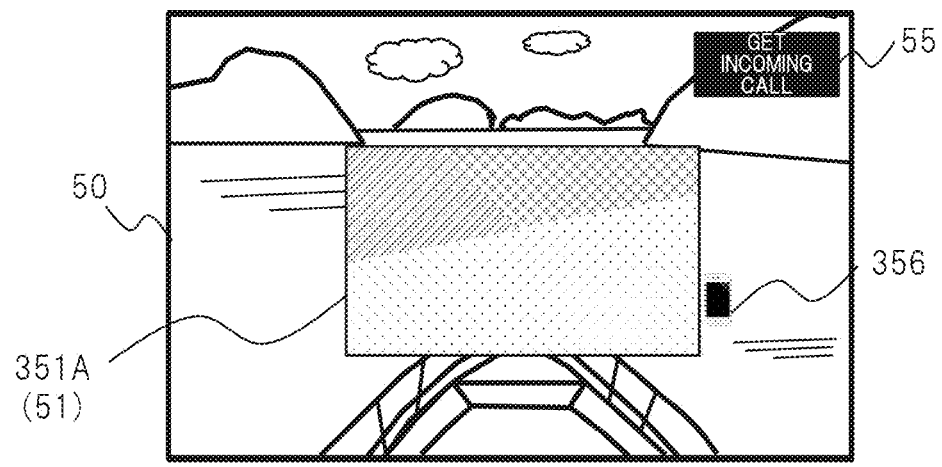
FIG. 13A is a diagram illustrating a displayed image when the information processor according to the second embodiment of the present invention is not within the capturing range of the camera.
Figure 13B:
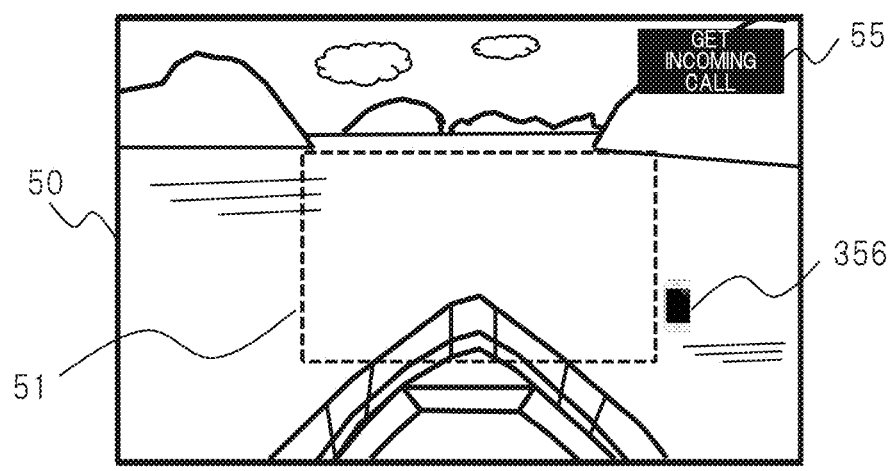
FIG. 13B is a diagram illustrating the displayed image when the information processor according to the second embodiment of the present invention is not within the capturing range of the camera.

Next, a case where the information processor 3 does not exist in the capturing range of the camera will be described. FIGS. 13A and 13B are diagrams illustrating displayed images when the information processor according to the second embodiment of the present invention does not exist in the capturing range of the camera.

When the information processor 3 does not exist in the capturing range of the camera, the head mounted display 2 recognizes the position of the information processor 3 by three-dimensional position detection using the proximity communication, for example. Then, a mark 356 indicating an existence direction of the information processor 3 is superimposed on the VR image 50 and displayed in an outer region of the capturing range 51 of a camera image. For example, in FIGS. 13A and 13B, the information processor 3 is positioned on a right side of the capturing range 51, so that the mark 356 is displayed on the right side of the capturing range 51.

In FIGS. 13A and 13B, the image of the information processor is shown as the mark 356, but an icon may be used as the mark 356. Also, an icon (for example, an arrow) indicating the existence direction of the information processor 3 may be used as the mark 356. In this case, a position of the mark is not particularly limited.

The example of FIG. 13A is similar to that of FIG. 12A, and an image in which the VR image 50 and the captured image 351A are superimposed is displayed on the displays 22a and 22b. Furthermore, the mark 356 indicating the existence direction of the information processor 3 is superimposed on the VR image 50 and displayed outside a captured image 351A (capturing range 51).

The user 1 directs the head mounted display 2 in a direction in which the mark 356 is displayed or in a direction indicated by the mark 356 until the information processor 3 enters the captured image 351A. Then, when the information processor 3 enters the capturing range 51, the user 1 picks up the information processor 3 and operates the information processor 3 while viewing the captured image 351A.

Meanwhile, in the example of FIG. 13B, regardless of presence or absence of notification from the information processor 3 or detection of an intention of the user 1 to use the information processor 3, while the user 1 is experiencing the VR contents, for example, a three-dimensional position of the information processor 3 is always detected by the proximity communication. Then, the mark 356 is superimposed on the VR image and displayed on the displays 22a and 22b.

The user 1 moves the head mounted display 2 while looking at the mark 356 so that the information processor 3 enters near the front of the head mounted display 2. Then, the user 1 picks up the information processor 3 and operates the information processor 3 while viewing the captured image 351A.

Note that when the head mounted display 2 recognizes that the user 1 reaches out and touches the information processor 3 by the analysis and the like of the captured image (imaged image data), the head mounted display causes it to superimpose the information processor 3 and the hand and display them and can notify the user 1 that the information processor 3 has been recognized.

According to the present embodiment, the user 1 can find the information processor 3 even if the user 1 does not know the position of the information processor 3. Therefore, the user 1 can hold the information processor 3 by the hand and use it without attaching or detaching the head mounted display 2.

Fourth Embodiment

Next, a fourth embodiment will be described. In the present embodiment, a cooperation processing for allowing the user 1 to use the information processor 3 is performed in accordance with a cooperation instruction from the user 1. That is, in the present embodiment, based on an active cooperation instruction from the user 1, a cooperation processing between the head mounted display 2 and the information processor 3 is started. The head mounted display 2 is informed that the user 1 intends to use the information processor 3 by the cooperation instruction of the user 1.

Figure 14:
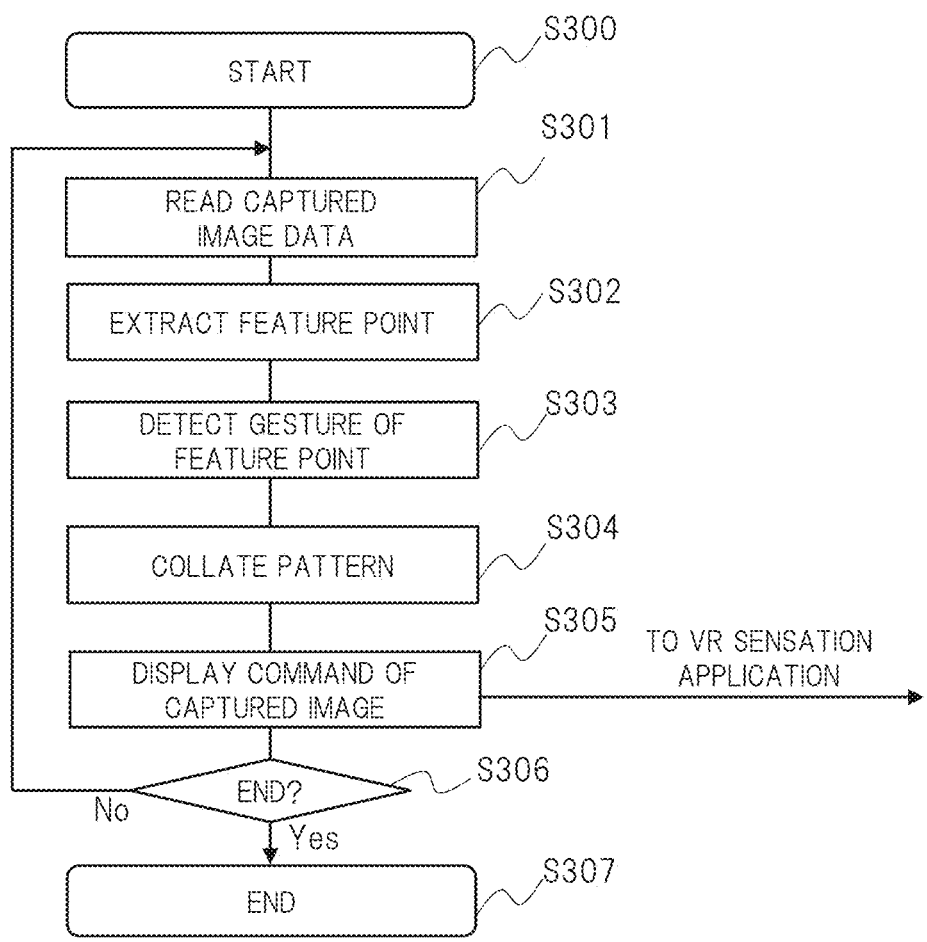
FIG. 14 is a flow diagram showing one example of a method of detecting a user's cooperation instruction according to a fourth embodiment of the present invention.

FIG. 14 is a flow diagram showing one example of a method of detecting a cooperation instruction of a user according to a fourth embodiment of the present invention. In an example of FIG. 14, the cooperation instruction from the user 1 is detected through a gesture of the user 1 (including motion patterns of the finger of the user 1) from the captured images of the cameras 20a and 20b.

When the image analysis application is activated, imaging by the cameras 20a and 20b is started (step S300). The head mounted display 2 (controller 220) takes in captured image data generated by the cameras 20a and 20b (step S301), analyzes the captured image data, and extracts feature points of the captured image (step S302). The feature points extracted here are, for example, the hand and fingers of the user 1.

Then, the head mounted display 2 detects gestures (motion patterns) of the feature points by using analysis results of a plurality of pieces of captured image data (step S303). The head mounted display 2 collates the gestures of the feature points detected in step S303 and a collation gesture registered in advance (step S304). The collation gesture may include a gesture(s) other than those corresponding to the cooperation instruction of the user 1. In pattern collation, the gestures of the detected feature points are collated with the registered collation gesture, and it is determined what the user 1 wants to do.

Then, when detecting the cooperation instruction of the user 1 by the pattern collation in step S304, the head mounted display 2 outputs to the VR sensation application 227 a command to perform the cooperation processing (step S305). Meanwhile, if the cooperation instruction of the user 1 is not detected in the pattern collation in step S304, step S305 is ignored.

In step S306, the head mounted display 2 determines whether to terminate the image analysis application. If the motion pattern detection application is terminated (Yes), its processing proceeds to step S307 and the image analysis application is terminated. Meanwhile, if the image analysis application is not terminated (No), the processings of steps S301 to S306 are performed again.

Figure 15:
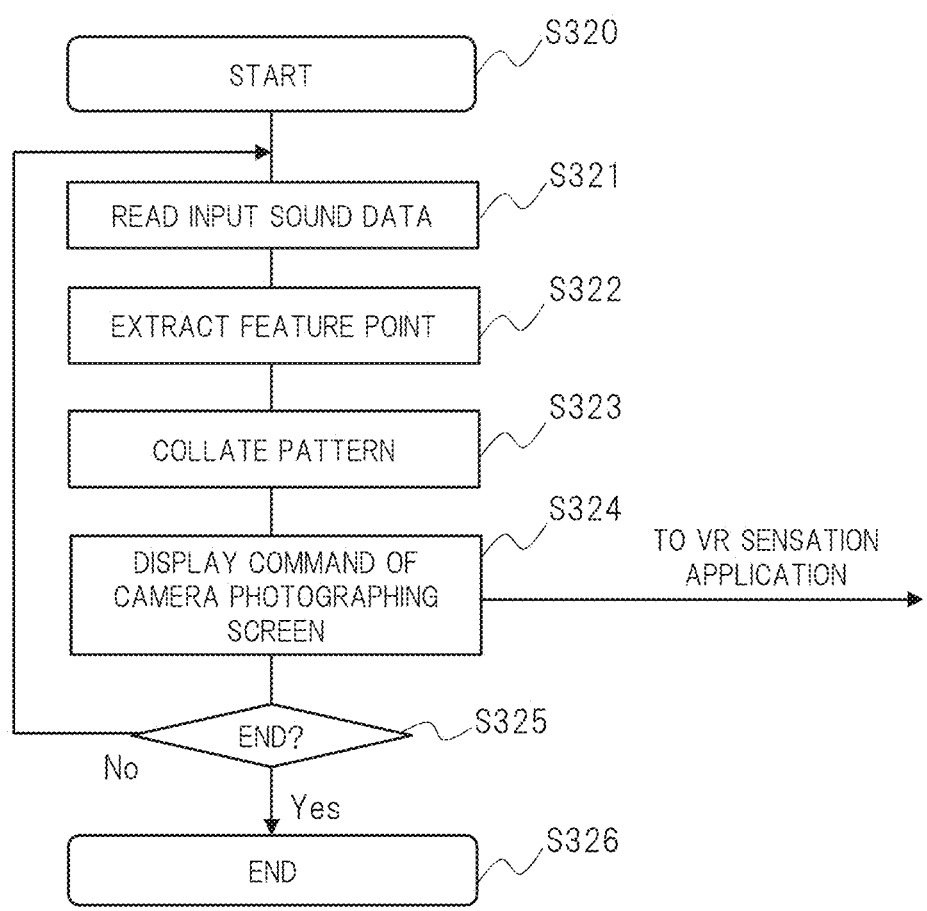
FIG. 15 is a flow diagram showing another example of the method of detecting the user's cooperation instruction according to the fourth embodiment of the present invention.

FIG. 15 is a flow diagram showing another example of a method of detecting a cooperation instruction of the user according to the fourth embodiment of the present invention. FIG. 15 shows a method of detecting a cooperation instruction of the user 1 from uttered voice of the user 1.

When the voice recognition application is activated, voice acquisition by the microphone 24 is started (step S320). The head mounted display 2 (controller 220) takes in input sound data generated by the microphone 24 (step S321), analyzes the input sound data, and extracts features of input sound (step S322). The features of the input sound extracted here are, for example, words, phrases, sentences and the like of the inputted audio.

Then, the head mounted display 2 collates the features of the input sound extracted in step S322 with a collation feature registered in advance (step S323). The collation feature may include features other than those corresponding to the cooperation instructions of the user 1. In the pattern collation, the extracted features of the input sound are collated with the registered collation features, and it is determined what the user 1 wants to do.

Then, when detecting the cooperation instruction of the user 1 by the pattern collation in step S323, the head mounted display 2 outputs to the VR sensation application 227 a command to perform the cooperation processing (step S324). Meanwhile, if the cooperation instruction of the user 1 is not detected in the pattern collation of step S323, step S324 is ignored.

In step S325, the head mounted display 2 determines whether to terminate the image analysis application. If the voice recognition application is terminated (Yes), its processing proceeds to step S326 and the voice recognition application is terminated. Meanwhile, if the voice recognition application is not terminated (No), the processings of steps S321 to S325 are performed again.

Figure 16:
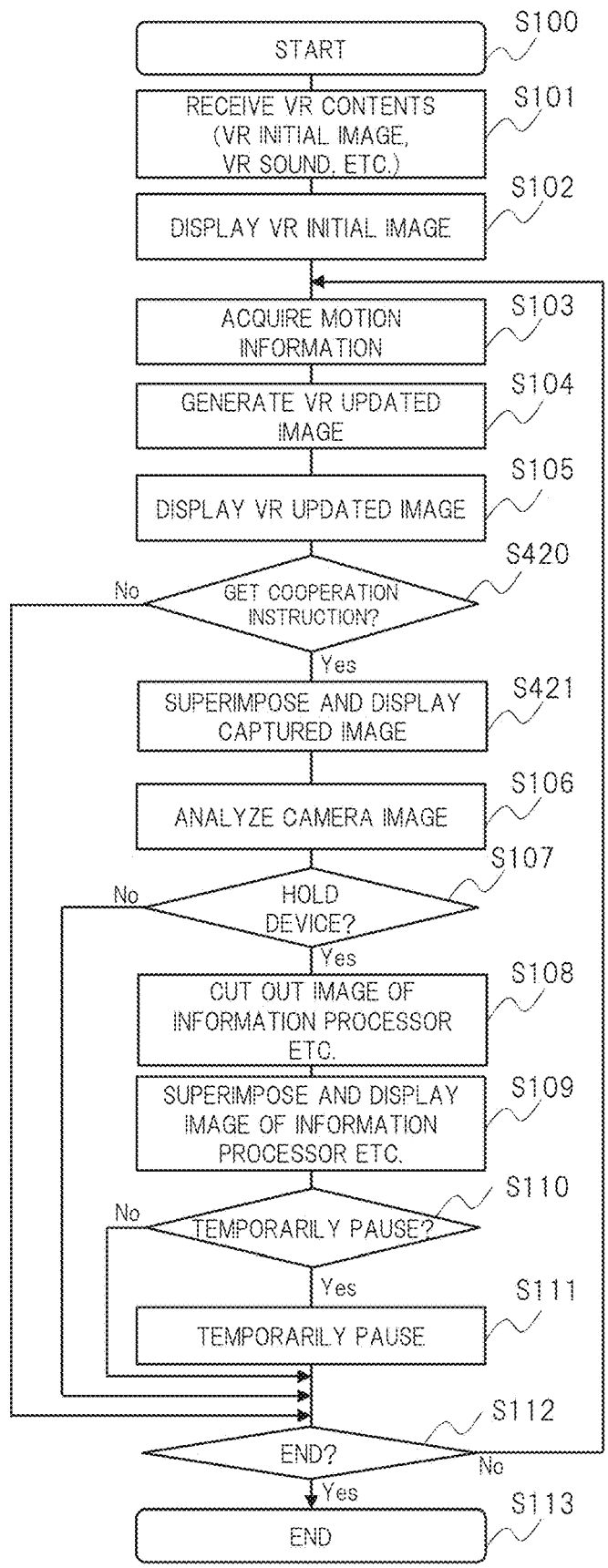
FIG. 16 is a flow diagram showing one example of a cooperative processing by a VR sensation application according to the fourth embodiment of the present invention.

FIG. 16 is a flow diagram showing one example of a cooperative processing by the VR sensation application according to the fourth embodiment of the present invention. Note that since FIG. 16 is similar to FIG. 5, a difference with FIG. 5 will be mainly described below.

When the VR updated image is displayed in step S105, its processing proceeds to step S420. In step S420, it is determined whether an instruction to perform a cooperation processing based on the cooperation instruction of the user 1 is present or absent.

When the instruction to perform the cooperation processing based on the cooperation instruction from the user 1 is present, a predetermined cooperation signal is inputted to the controller 220 (computer 222) from, for example, a memory 223 or a register (not shown) in the computer 222. Based on the cooperation signal, the controller 220 determines by the cooperation signal whether an instruction to perform the cooperation processing based on the cooperation instruction of the user 1 is present or absent.

When the cooperation signal is inputted (Yes), the controller 220 recognizes that the instruction to perform the cooperation processing based on the cooperation instruction of the user 1 is present. That is, in this case, the controller 220 determines that the user 1 has an intention to use the information processor 3. Then, its processing proceeds to step S421.

Meanwhile, if the cooperation signal has not been inputted (No), the controller 220 recognizes that the instruction to perform the cooperation processing based on the cooperation instruction of the user 1 is absent. That is, in this case, the controller 220 determines that the user 1 has no intention to use the information processor 3. Then, its processing proceeds to step S112.

In step S421, the controller 220 superimposes and displays the VR image and the captured images of the cameras 20a and 20b. In this way, the VR image and the captured images are superimposed and displayed based on the cooperation instruction from the user 1. The processings after step S421 are the same as those in FIG. 5.

According to the present embodiment, it is possible to detect the active cooperation instruction by the user 1 and start using the information processor 3 while experiencing the VR contents.

Fifth Embodiment

Next, a fifth embodiment will be described. In the present embodiment, the user 1 who is experiencing VR contents can use an object(s) other than the information processor 3.

Figure 17:
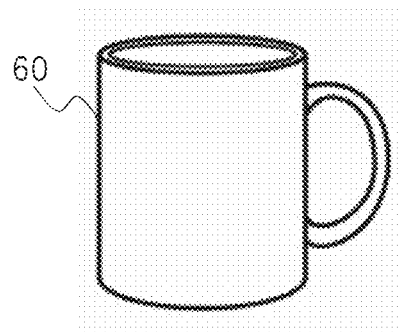
FIG. 17 is a diagram showing one example of an object used during VR content sensation according to a fifth embodiment of the present invention.

FIG. 17 is a diagram showing one example of an object used while experiencing VR contents according to a fifth embodiment of the present invention. FIG. 17 illustrates a mug 60 as an object, but an object(s) other than the mug may be used. In the present embodiment, a shape of the object is registered in advance.

The head mounted display 2 (controller 220) analyzes the captured image using the image analysis application. When the mug 60 is detected from the captured image, the head mounted display 2 superimposes, for example, an image of the mug 60 on the VR image and displays it. This allows the user 1 to take a coffee break or the like by using the mug 60, for example, while experiencing the VR contents.

Figure 18A:
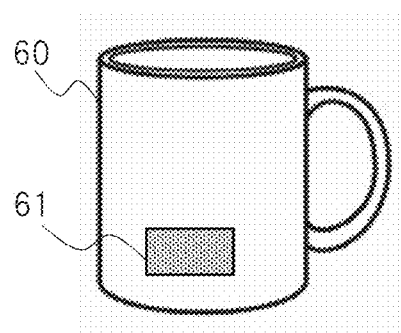
FIG. 18A is a diagram showing another example of the object used during the VR content sensation according to the fifth embodiment of the present invention.

FIG. 18A is a diagram showing another example of an object used while experiencing VR contents according to the fifth embodiment of the present invention. FIG. 18A illustrates a mug 60, to which a communication module 61 is attached, as an object. The head mounted display 2 can detect a position of the mug 60 based on the proximity communication signal (position detection signal) transmitted from the communication module 61 even when the position of the mug 60 is unknown.

Figure 18B:
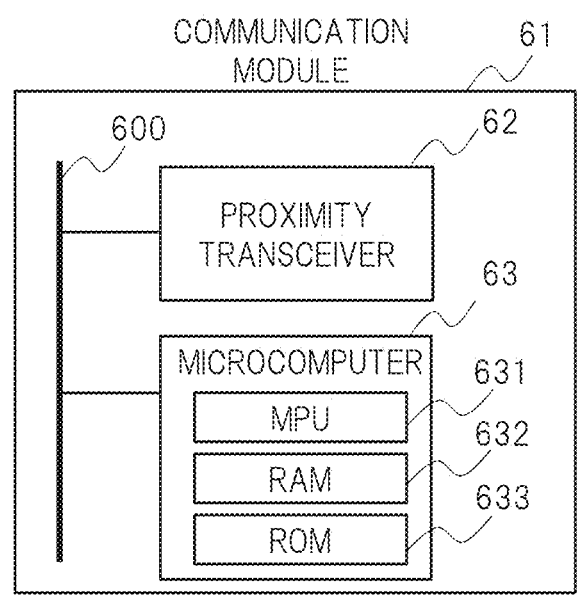
FIG. 18B is a block diagram showing one example of a communication module.

FIG. 18B is a block diagram showing one example of a communication module. As shown in FIG. 18B, a communication module 61 includes a proximity transceiver 62 and a microcomputer 63. The proximity transceiver 62 and the microcomputer 63 are connected to each other via an internal bus 600.

The microcomputer 63 incorporates, for example, an MPU (Micro Processor Unit) 631, a memory 632, and a storage 633, as shown in FIG. 18B.

The head mounted display 2 receives the proximity communication signal transmitted from the proximity transceiver 62, and detects a three-dimensional position of the mug 60. Based on the detected three-dimensional position of the mug 60, the head mounted display 2 superimposes the VR image 50 and a mark indicating an existence direction of the mug 60 and displays it.

When the user 1 discovers the mug 60, the user 1 picks up the mug 60 and takes the coffee break. Note that when using the mug 60, the user 1 may pause the progress of the VR contents.

According to the present embodiment, the user 1 can use the object other than the information processor 3 while experiencing the VR contents.

Note that the present invention is not limited to the above-described embodiments, and includes various modification examples. For example, the above-described embodiments have been described in detail in order to explain the present invention in an easy-to-understand manner, and are not necessarily limited to those having all of the described configurations.

Also, a part of a configuration of one embodiment can be replaced with a configuration of another embodiment. It is also possible to add a configuration of another embodiment to a configuration of one embodiment. Moreover, it is possible to add, delete, or replace a part of the configuration of each embodiment to, from, or with another configuration. All of these belong to the scope of the present invention, and numerical values, messages, and the like appearing in the texts and the drawings are also only examples, and even if different ones are used, the effects of the present invention are not impaired.

Also, the functions of the invention may be implemented in hardware, for example, by designing a part or all of them in an integrated circuitry. It may also be implemented in software by a microprocessor unit, CPU, and the like interpreting and executing an operation program. Moreover, an implementation range of software is not limited, and hardware and software may be used together. Note that each member and relative size described in the drawings are simplified and idealized in order to explain the present invention in an easy-to-understand manner, and may have a more complicated shape in mounting.

EXPLANATION OF REFERENCE NUMERALS

1 . . . User; 2 . . . Head mounted display; 3 . . . Information processor; 4a to 4c . . . Network signal; 5 . . . Access point; 6 . . . Network; 7 . . . VR service server; 8 . . . Proximity communication; 20a, 20b . . . Camera; 210 . . . Sensor group; 22a, 22b . . . Display; 24 . . . Microphone; 25a, 25b, 25c . . . Proximity communication receiver; 220 . . . Controller; 221 . . . Transceiver; 222 . . . Computer; 223 . . . Memory; 224 . . . Image memory; 225 . . . Storage; 50 . . . VR image; 51 . . . Capturing range; 52, 352 . . . Image of information processor; 53 . . . Overlay image; 55 . . . Incoming icon; 351A . . . Captured image; 351B . . . transparentizing image; 351C . . . Line drawing processed image; 356 . . . Mark; 60 . . . Mug; and 61 . . . Communication module.

The invention claimed is:

1. A head mounted display comprising:
a non-transmissive display;
a camera;

a transceiver configured to connect to an information processor;
a memory configured to store a virtual reality (VR) content and reception image data indicating that there is an incoming call or a data reception; and
circuitry,
wherein the circuitry is configured to:
  start a progress of the VR content read out from the memory to display VR image data included in the VR content on the non-transmissive display,
  in response to receiving a notification indicating the incoming call or the data reception to the information processor via the transceiver while displaying the VR image data on the non-transmissive display, display the reception image data read out from the memory on the non-transmissive display superimposing on the VR image data, and analyze a captured image of the camera, and
  in response to determining from a result of the analysis that a user of the head mounted display holds the information processor and that the information processor moves in the captured image, display an image of the information processor on the non-transmissive display superimposing on the VR image data, and pause the progress of the VR content.

2. The head mounted display according to claim 1,
wherein the circuitry is configured to acquire a displayed image from the information processor, and superimpose the image of the information processor and the displayed image of the information processor, and cause the non-transmissive display to display them.

3. The head mounted display according to claim 1,
wherein the reception image data is image data of an incoming call icon or a received icon.

4. The head mounted display according to claim 1,
wherein, in response to receiving an erasing request of the reception image data from the information processor via the transceiver, the head mounted display finishes displaying the reception image data.

5. The head mounted display according to claim 1,
wherein, in response to receiving an erasing request of the reception image data from the information processor via the transceiver, the head mounted display finishes displaying the reception image data and restarts the progress of the VR content.

6. The head mounted display according to claim 1,
wherein the head mounted display finishes displaying the reception image data when a predetermined time elapse after displaying the reception image data on the non-transmissive display.

7. The head mounted display according to claim 1,
wherein the head mounted display downloads the VR content from a server via the transceiver and stores the downloaded VR content in the memory.

8. The head mounted display according to claim 1,
wherein the transceiver has a proximity communication function.

* * * * *